United States Patent [19]
Zaluzec et al.

[11] Patent Number: 5,464,146
[45] Date of Patent: Nov. 7, 1995

[54] THIN FILM BRAZING OF ALUMINUM SHAPES

[75] Inventors: Matthew J. Zaluzec, Canton; Gerald A. Grab, Trenton; Warren A. Smith, Milan, all of Mich.

[73] Assignee: Ford Motor Company, Dearborn, Mich.

[21] Appl. No.: 315,039

[22] Filed: Sep. 29, 1994

[51] Int. Cl.⁶ .......................... B23K 1/19; B23K 1/20
[52] U.S. Cl. .................. 228/208; 228/254; 228/262.51; 228/197
[58] Field of Search .......................... 228/183, 262.51, 228/194, 196, 208, 254, 197

[56] References Cited

U.S. PATENT DOCUMENTS

| | | |
|---|---|---|
| 4,010,530 | 3/1977 | Delgrosso et al. . |
| 4,011,982 | 3/1977 | Marancik . |
| 4,606,495 | 8/1986 | Stewart, Jr. et al. . |
| 4,681,251 | 7/1987 | Komatsu et al. . |
| 4,831,701 | 5/1989 | Yutaka . |
| 4,890,784 | 1/1990 | Bampton . |
| 4,891,275 | 1/1990 | Knoll . |
| 4,901,908 | 2/1990 | Negura et al. . |
| 4,978,051 | 12/1990 | Tiearney, Jr. et al. . |
| 5,072,789 | 12/1991 | Usui et al. . |
| 5,083,697 | 1/1992 | Difrancesco . |
| 5,100,048 | 3/1992 | Timsit .................... 228/262.51 |
| 5,190,596 | 3/1993 | Timsit .................... 228/262.51 |

*Primary Examiner*—Samuel M. Heinrich
*Attorney, Agent, or Firm*—Joseph W. Malleck; Roger L. May

[57] ABSTRACT

An improved method of brazing of two unclad aluminum shapes, particularly for automotive heat exchangers, which brazing joint does not leave a physically apparent layer of brazing material and which effects a stronger, sounder autogenous joint. A thin film of aluminum eutectic forming material (Si, Al-Si or Al-Zn) is deposited onto a zone of at least one of the shapes to be brazed or joined. The shapes are placed in joining relationship to form an assembly with a joint at the zone. The assembly is heated to a temperature to diffuse the eutectic forming material into the aluminum members to form a sacrificial bond between the shapes at the joining zone. It is desirable that at least one of the unclad aluminum shapes to be joined is extruded tubing having a precise diametrical configuration and said film is deposited as a physically vapor deposited layer in a thickness range of 1–50 microns.

11 Claims, 6 Drawing Sheets

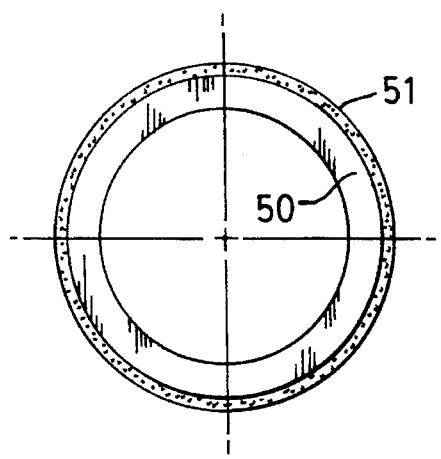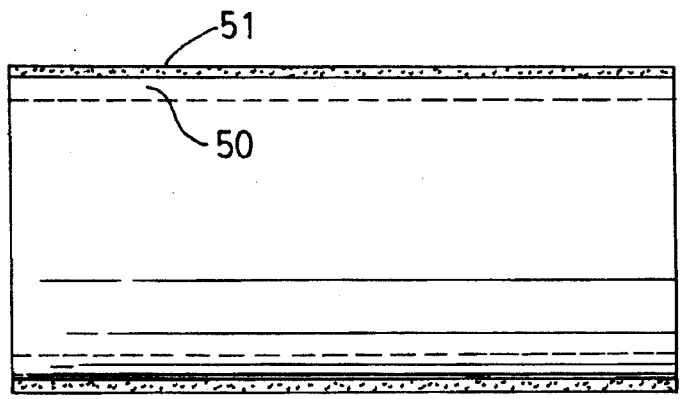
FIG-9  FIG-10
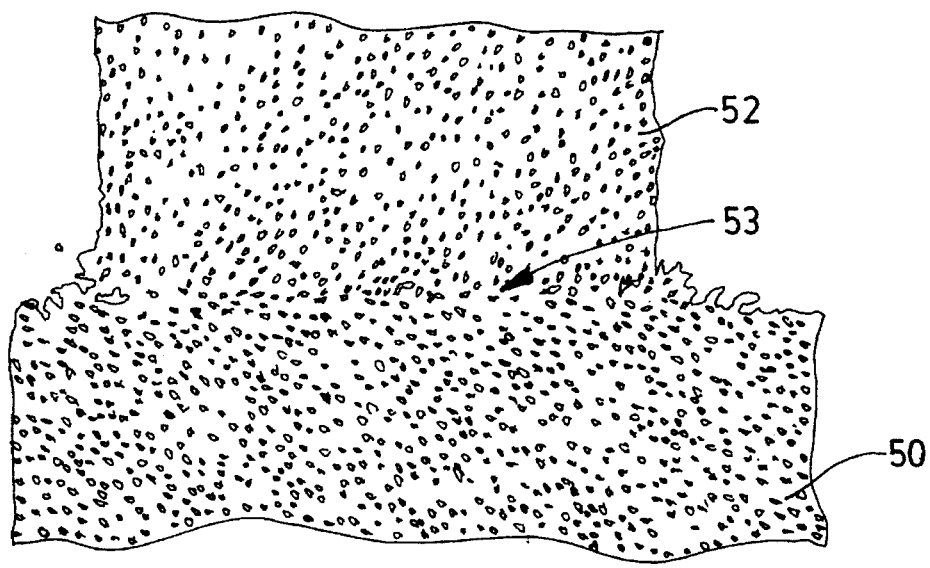
FIG-11

THIN FILM BRAZING OF ALUMINUM SHAPES

BACKGROUND OF THE INVENTION

1. Technical Field

This invention relates to the technology of cladless brazing of metals, and more particularly to the use of sacrificial films that form a eutectic with the metals to be joined and create a joint.

2. Discussion of the Prior Art

The prior art has generally employed (i) deposition of relatively thick braze material into a joint area, (ii) use of metal structural sheets clad with brazing material, or (iii) liquid phase pressure diffusion brazing of precoated members.

Deposition of thick brazing material can be by thermal spraying of powder (such as in U.S. Pat. No. 4,606,495) or by hot liquid dipping in a molten bath of clad metal. A non-uniform thickness of the deposited brazed material will often affect physical properties of the joint, producing interfacial flaws.

Clad brazing sheets, although requiring thinner, more uniform layers of brazing material, (see U.S. Pat. No. 4,901,908) restrict and inhibit the type of shapes that can be assembled and structured because the clad brazing sheets are difficult to form into complex shapes (such difficulty is due to the fact that clad layers are rolled bonded to sheet which has limited formability). The clad sheets also cannot be made to fit certain mating components, such as tubes, because tube fabrication requires a seamless joint which cannot be achieved by rolling sheet into tube. Clad sheets may also more readily contain oxides in the clad layer.

Pressure diffusion bonding may also employ clad sheets or braze coated members to affect the joint. Use of pressure not only limits shapes that can be made because of the constraints of how pressure is to be applied, but since diffusion bonding is needed, the type of material that can be used is restricted. For example, in U.S. Pat. No. 4,890,784, the brazing materials were limited to Al-Ni, Al-Zn, or Al-Cu to carry out dissolution of the aluminum in the structural members to be bonded to promote diffusion of the aluminum into binary alloys of the braze material to create a modified interlayer. This is disadvantageous because the components to be brazed must be pressure bonded together to get an effective braze joint; this is most amenable to sheet products, but only in low volumes.

SUMMARY OF THE INVENTION

It is an object of this invention to provide an improved method of brazing two aluminum shapes, particularly for automotive heat exchangers, in which the brazing joint does not leave a physically apparent layer of brazing material and which effects a stronger, sounder joint.

The invention, in a first aspect, is a method of brazing unclad aluminum shapes to effect an autogenous joint, comprising: (a) depositing a thin film of aluminum eutectic forming material onto a zone of at least one of the shapes to be brazed or joined; (b) placing the shapes in joining relationship to form an assembly with a joint at said zone; and (c) heating said assembly to a temperature to diffuse said eutectic forming material into the aluminum members to form a sacrificial bond between the shapes at said joining zone.

It is desirable that at least one of the unclad aluminum shapes to be joined is extruded tubing having a precise diametrical configuration and said film is deposited as a physically vapor deposited layer in a thickness range of 1–50 microns.

BRIEF DESCRIPTION OF THE DRAWINGS

FIGS. 9 and 10 are respectively longitudinal and cross-sectional views of a tube coated in accordance with this invention employing a thin sacrificial silicon film;

FIG. 11 is a simulated sketch of an optical microphoto of the interfacial bond of the coated tube of FIGS. 9 and 10 to the aluminum sheet;

DETAILED DESCRIPTION AND BEST MODE

In current commercial practice, the inlet and outlet tubes are welded to the previously brazed heat exchanger using clad sheets of aluminum for the plates and fins. Thus the bonding of the inlet or outlet tubes to the header of such heat exchanger is a secondary operation. The use of the present invention allows the entire bonding assembly to take place in one operation reducing the cost of manufacturing.

Figure 1:
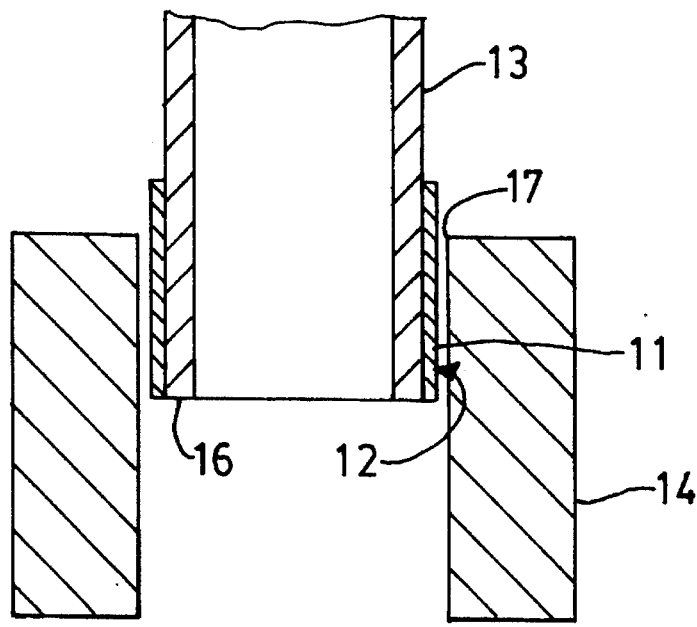
FIGS. 1 and 2 are respectively enlarged sectional views of a portion of FIG. 3 generally taken along line 2—2, each showing the brazing method in sequential steps.
Figure 2:
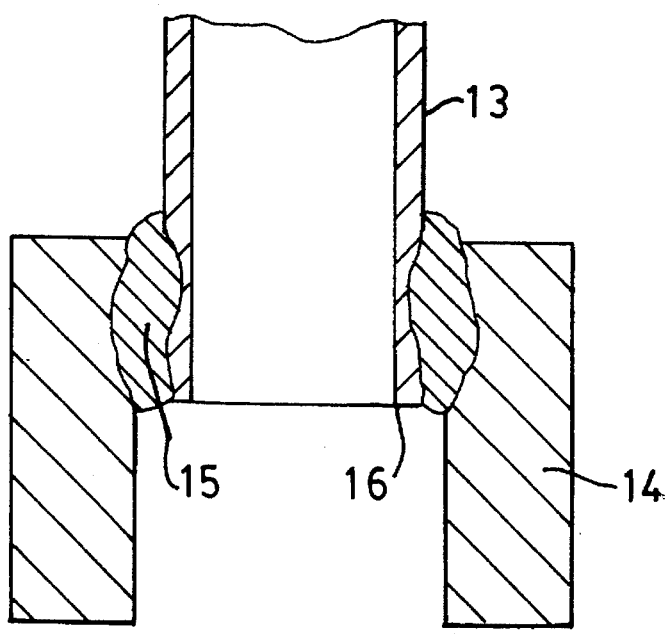

As shown in FIGS. 1 and 2, a thin sacrificial film 11 of an aluminum eutectic forming material is deposited onto a selected zone 12 of at least one of the aluminum based members or shapes 13,14 to be joined. The aluminum eutectic forming material is one which forms essentially a eutectic alloy that diffuses into the metal of the member or shapes 13,14 to leave an autogenous bond, such as at 15. There is thus no independent residual brazing material in the bond; the bond is not brittle, has no corrosion and prevents pitting from incomplete brazing. The shapes or core members are preferably formed of 3003 aluminum containing 0.60 Si max, 0.70 Fe max, 0.1–0.30 Cu, 0.15–0.80 Mg, 0.10–0.80 Mn, 0.20 Cr max, 0.05 Ni max, and balance aluminum. The eutectic forming material after reacting with aluminum must have a lower melting point than the core metal of the shapes being brazed. The material is preferably silicon, but can be a eutectic comprising material selected from the group consisting of Si, Al-Si (with 8–18% by weight Si), and Al-Zn (with 10–20% Zn). The ingredient can also contain minor amounts (such as 0.1–1.0%) of a flow promoter, such as Bi, Li, Mg, strontium or copper.

Figure 3:
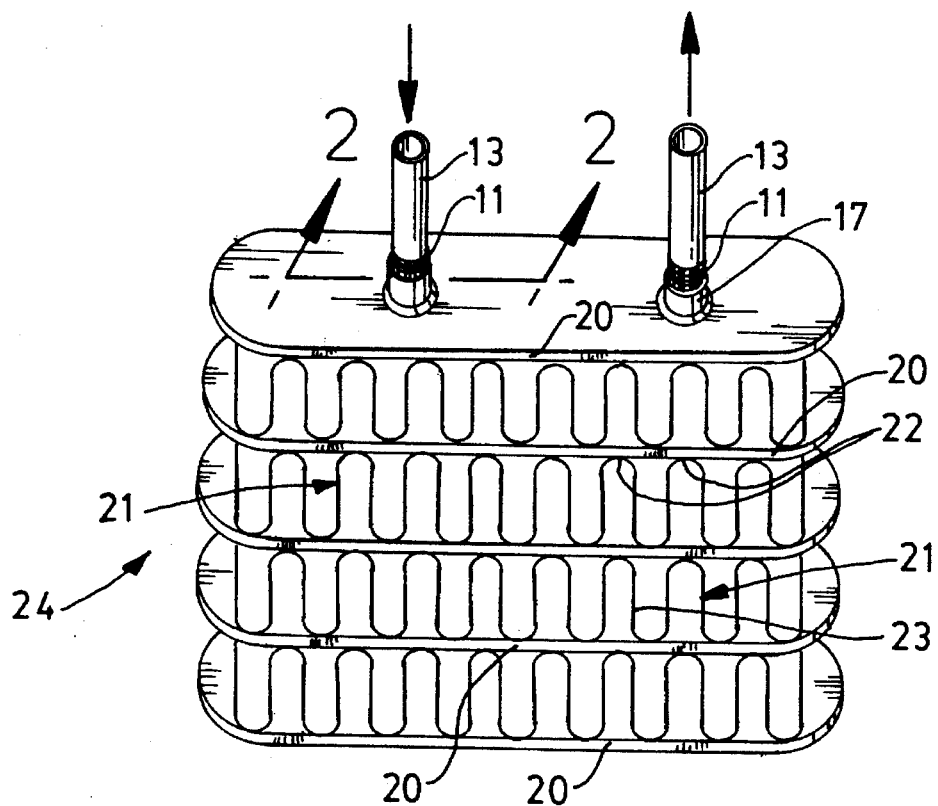
FIG. 3 is a perspective view of an evaporator having plates brazed to tubes and to fins in accordance with this invention.

The select zone 12 can be the end of an inlet or outlet tube member 13 to be jointed to walls 17 defining a nipple or opening in a header 20 of a heat exchanger 24 (as shown in FIG. 3). The heat exchanger is an evaporator comprised of aluminum based plates 20 layered with intervening aluminum-based fins 21. For this assembly, the zones of bonding can also be the contact points or lines 22 between folds or corrugations 23 of the fins 21 and the flat plates 20. The film 11 can be desirably located only at such intended contact points or lines.

The aluminum eutectic forming material of the film promotes improved bonding by its full or partial sacrificial nature. With silicon alone, the ingredients diffuse fully into the core aluminum of the members to be joined when heated to a temperature that effects a eutectic aluminum alloy formation. About 6% of silicon is soluble in aluminum. With the aluminum eutectic forming ingredient containing a higher content of silicon in an aluminum alloy form, 6% of the silicon will migrate into the core aluminum to form a eutectic aluminum phase while the remainder of the Al-Si alloy will reside as a low melting point, essentially eutectic alloy. Similarly with the aluminum eutectic forming material containing zinc, some of the zinc will diffuse into the core of the aluminum to form a eutectic aluminum-zinc phase while the remainder of the ingredients remain as a low melting point, essentially eutectic material.

Figure 4A:
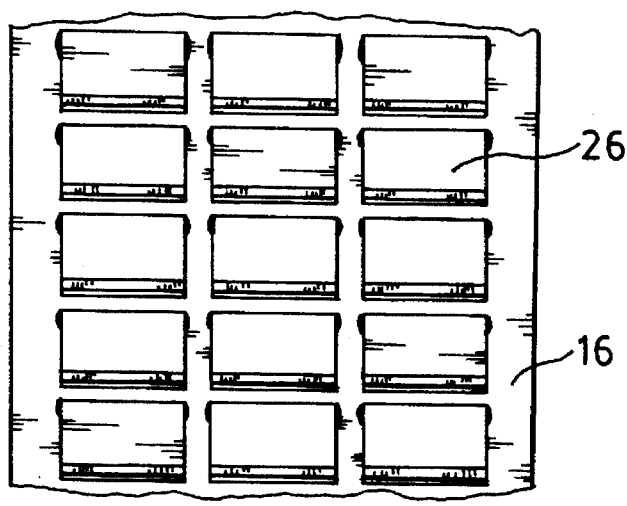
FIGS. 4a and 4b are schematic illustrations of a prior art louvered fin using braze clad sheets for creating the construction of a perforated or louvered fin plate (FIG. 4a is front elevational and FIG. 4b is side elevational)

The advantage of this bonding process is that it forms an autogenous joint particularly with heat exchangers such as automotive evaporators; this is apparent when comparing the results to conventional brazing with clad sheets. As shown in FIG. 4a, a conventional heat exchanger will use a braze sheet 16 consisting of a clad aluminum-silicon layer bonded to 3003 type aluminum core. When cooling fins 18 for the heat exchanger are formed, louvers 26 are stamped out of the clad aluminum brazed sheet 16. The function of the louvers 26 is to increase surface area and allow air flow through the openings left by the louvers to increase cooling capacity. However, when the clad layer melts during brazing, it wicks into the gap 27 between the louver 26 opening and fin 18 to fill such gap and decrease the cooling capacity of the heat exchanger.

Figure 5:
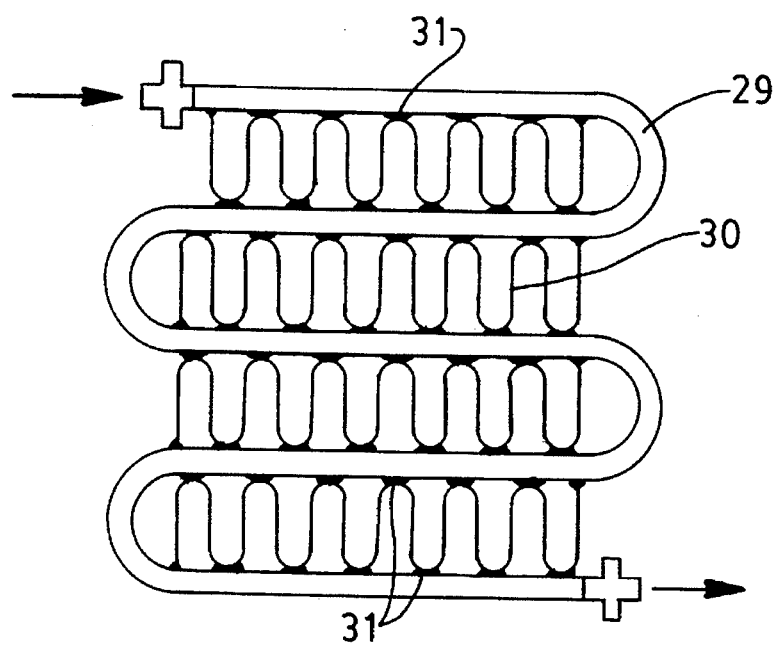
FIG. 5 is a schematic view of an evaporator fabricated with extruded multi-channel braze coated tubes, for brazing to corrugated fins, in accordance with this invention.
Figure 4B:
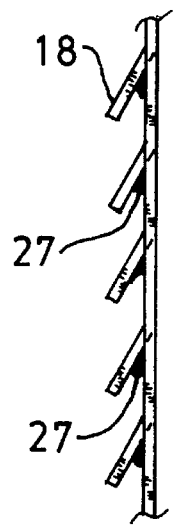
Figure 6:
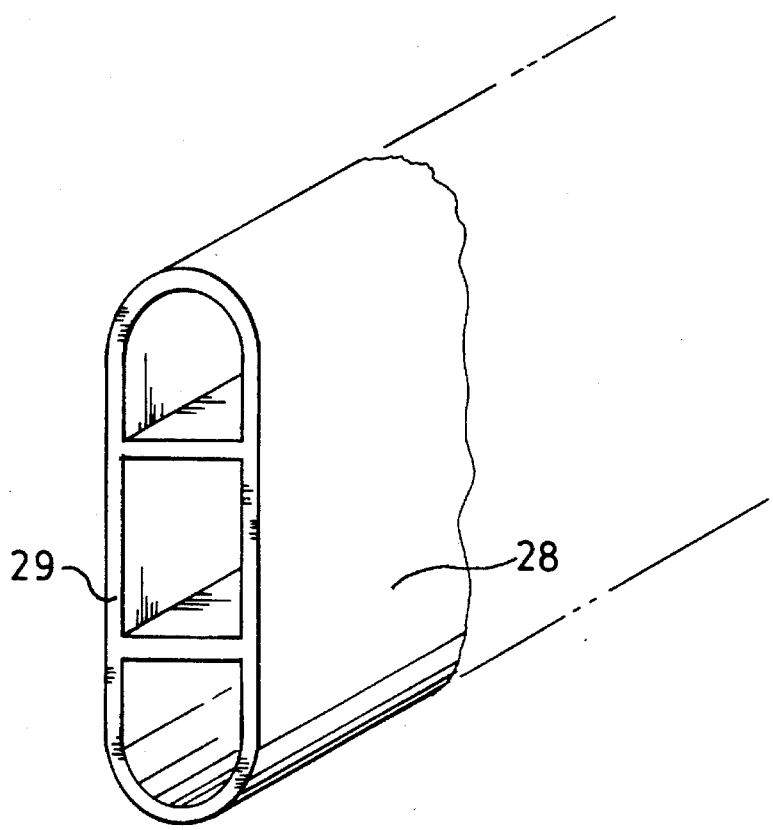
FIG. 6 is an enlarged perspective sectional view of a portion of the coated tube of FIG. 5.

By using the sacrificial thin film cladless coating process described herein, a thin layer of silicon 28 can be applied to an extruded multi-channelled tube 29 (see FIGS. 5 and 6) while leaving the fins 30 uncoated. The fins 30 are joined to the coated extruded tube 29 by application of heat that forms the aluminum eutectic forming phase at contact points 31 to diffuse into the core aluminum of both the fin and the tube. As mentioned, the fin material does not need to be clad as with the prior art of FIGS. 4a and 4b. Furthermore, the accurately sized extruded tubes 29 can be more readily formed into novel shapes allowing for unique heat exchanger designs without inhibiting the ability to braze the assembly or inhibit the ability to form proper shapes. This allows for more flexibility in heat exchanger design for underhood and under-packaging in automotive applications.

Figure 7:
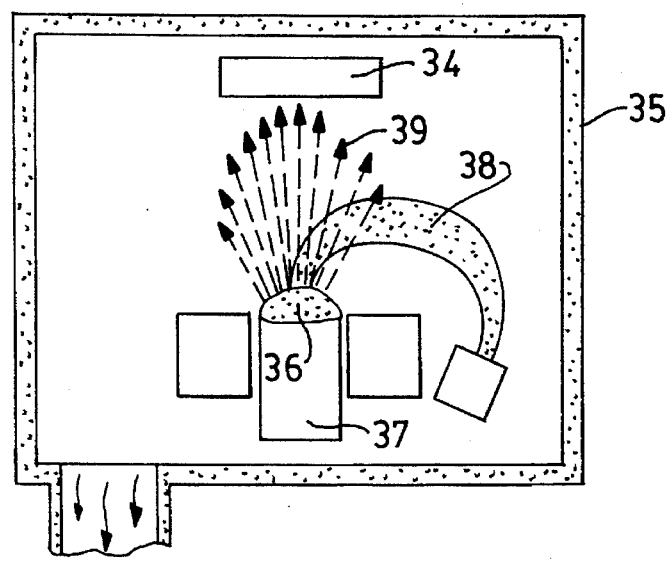
FIG. 7 is a schematic illustration of one method of applying the thin sacrificial film of this invention by physical vapor deposition using electron beam evaporation.

The film 11 must be particularly thin, in the range of 1–50 microns. This can be obtained by deposition techniques using electron beam physical vapor deposition or conventional sputtering as shown respectively in FIGS. 7 and 8. In FIG. 7, the tube or fin material 34 is placed in a vacuum chamber 35; a supply of the coating material 36, such as silicon, is placed on a pedestal 37 and an electron beam 38 is energized to bombard the supply of silicon to release evaporated particles 39 of the silicon in a vapor form. The vapor finds the target 34 to complete coating in a selected zone. The advantages of this deposition technique are high deposition rate and uniform coating thickness in the 1–50 micron range.

Figure 8:
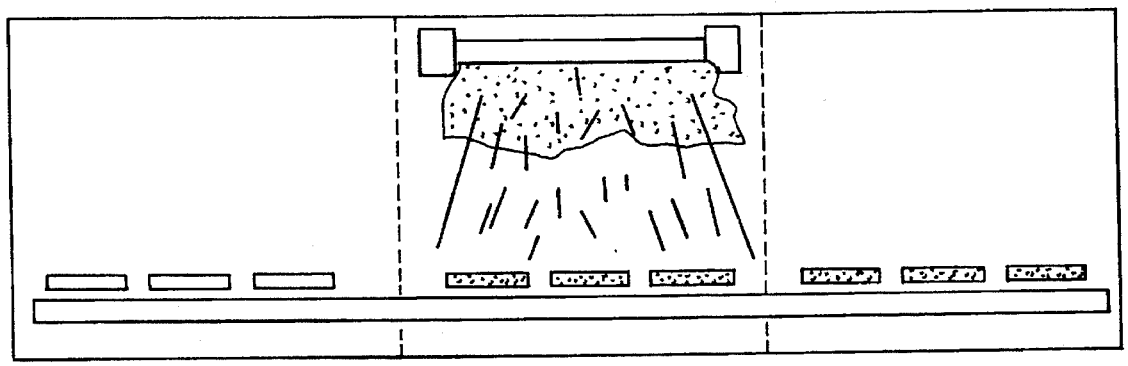
FIG. 8 is a schematic illustration of an alternative physical vapor deposition method for applying the thin sacrificial film using sputter deposition.

Inert gas sputtering can also be used as illustrated in FIG. 8. This process operates by ionizing an inert gas such as Ar or $N_2$, bombarding an electrically biased target with the ionized gas, causing the target to eject material (elemental coating) onto the part being coated as it travels along a conveyor belt.

After the members to be joined have been coated, they are assembled together to create contact there between at their selected coated zones. The assembled members or shapes are then heated to a temperature to form a low melting point eutectic alloy of the ingredients with the aluminum shapes such that all or a portion of said eutectic material will diffuse into one or both of the shapes at the zones and fill any space therebetween to effect an autogenous braze joint. The heating is preferably carried out to a temperature in the range of 578°–595° C. when the eutectic forming ingredients are as indicated above consisting of silicon or aluminum silicon, or aluminum zinc. Such eutectic forming materials are most desirable when the core aluminum of the members or shapes to be joined consist of 3003 aluminum.

To demonstrate proof of principle, an unclad 3003 aluminum tube 50 was coated with a one micron thick sacrificial silicon coating 51 and then brazed to an aluminum 3003 member 52 using the Nocolok flux brazing process. Nocolok flux brazing incorporates a water soluble $K_3AlF_6$/$KAlF_4$ flux compound onto the part being brazed in an inert gas chamber. The flux melts at 562°–577° C., strips the native aluminum oxide and allows the braze joint to wet mating components to form a braze joint at 578°–595° C.

A schematic of the tube before brazing is shown in FIGS. 9 and 10, and in FIG. 11, a simulated optical microphoto of a cross section of a portion of the joint after brazing is illustrated at a magnification of 100×. Within the temperature range noted, the sacrificial silicon coating has reacted with the aluminum from the core alloy, forming a low melting point aluminum-silicon eutectic (fusing at the lowest possible temperature), in which eutectic is diffused into the 3003 aluminum interface, by wetting the mating 3003 sheet and aluminum tube, resulting in the autogenous joint at 53 as illustrated. The brazed joint is unique in that no residual silicon is present at the interface between the two mating components indicating that the entire sacrificial silicon layer was consumed during the brazing process. This type of brazed joint represents a higher quality brazed joint since it is devoid of residual brittle silicon particles typically found in the brazed joint formed using conventional clad brazed sheet.

Figure 12:
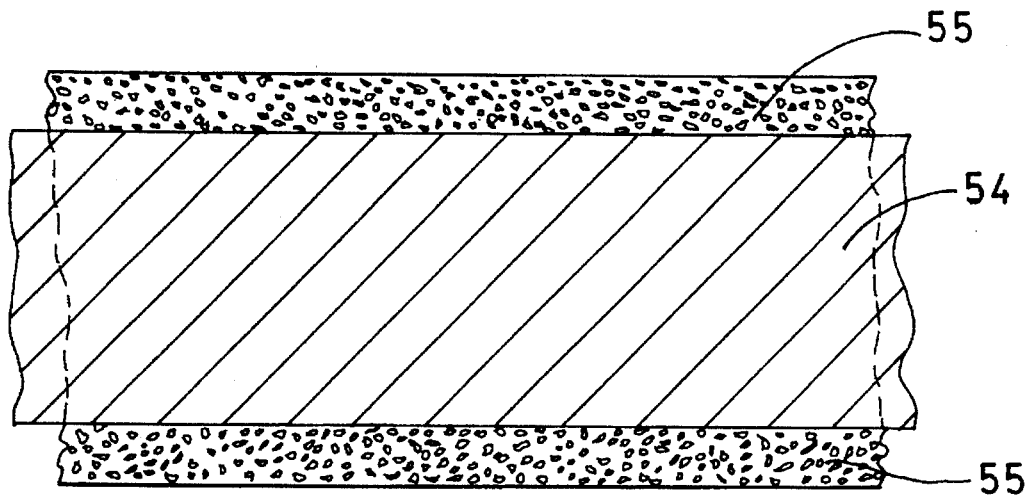
FIG. 12 is a cross sectional view of a clad aluminum sheet containing an aluminum/silicon clad layer composition, all in accordance with the prior art.
Figure 13:
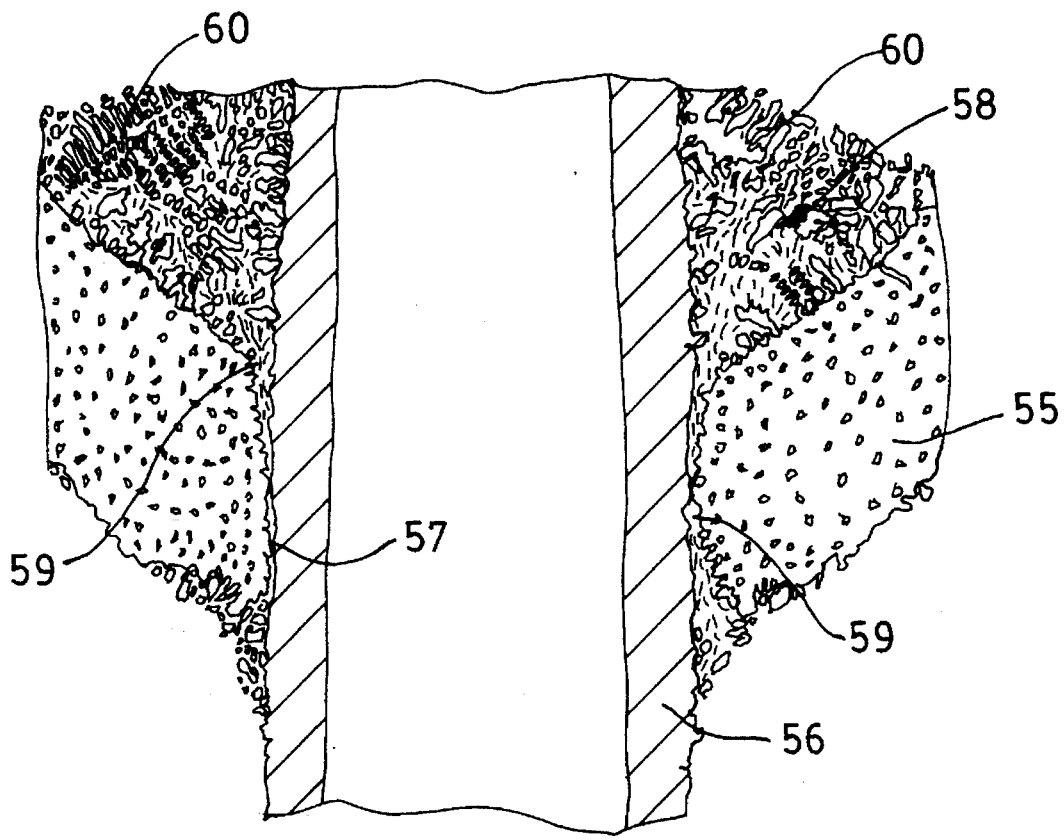
FIG. 13 is a simulated optical microphoto of the interfacial bond between the clad sheet of FIG. 12 and the mating plate or sheet to accept the tube.

FIG. 12 shows a simulated microphoto of a cross section of a typical brazed clad 3003 sheet 54 showing the aluminum-silicon clad layer 55 roll bonded to the aluminum sheet (at 100× magnification). This prior art clad sheet 54 is then bonded to a 3003 aluminum tube 56 at openings 57 in the sheet. The joint exhibits a microstructure as shown in FIG. 13 (25× magnification). The dendritic microstructure 60 of the fillet 58 of the brazed joint is apparent along with interfacial voids 59 and silicon particles. There is evidence of excessive grain boundary silicon penetration and interfacial void formation; these represent typical concerns regarding brazed join quality with respect to strength and corrosion resistance.

We claim:

1. A method of brazing unclad first and second aluminum alloy shapes to effect an autogenous joint therebetween, comprising:

depositing a thin sacrificial film of an aluminum eutectic forming material onto a selected zone of at least one of said shapes, the film being effective to uniformly continuously conformed to said zone and form essentially a eutectic alloy with the aluminum of said shapes;

(b) assembling said shapes together to create contact therebetween at said selected zones; and (c) heating such assembly to a temperature to form a eutectic alloy of said material and the aluminum of said shapes, such alloy migrating into one or both said shapes at said zones, filling any space therebetween to effect an autogenous joint.

2. The method as in claim 1, in which said thin film has a thickness in the range of 1–50 microns.

3. The method as in claim 1, in which said film during the heating step combines with the aluminum of said shapes to form an alloy essentially the same as the alloy of the shapes and thus becomes an autogenous braze joint.

4. The method as in claim 1, in which said alloying material comprises an element selected from the group consisting of silicon, aluminum silicon and aluminum zinc.

5. The method as in claim 4, in which the aluminum silicon material contains 8–18% by weight silicon and the material of aluminum zinc when selected contains 10–20% by weight zinc.

6. The method as in claim 1, in which said deposition of step (a) is carried out by electron beam physical vapor deposition.

7. The method as in claim 1, in which said deposition is carried out by conventional sputtering.

8. The method as in claim 1, in which said heating step is carried out in the temperature range of 578°–595° C. for a period of 1–5 minutes.

9. A method of brazing a tube, plate and fin heat exchanger for automotive applications, comprising:

(a) depositing at joint designated zones on at least one of said tube, plate or fins a thin sacrificial film of silicon in a uniform thickness of 1–50 microns by vapor deposition or sputtering;

(b) forming said tubes, plates and fins into a heat exchanger assembly with said coated zones of said tube, fin or plates in a joint forming relationship with the other of said tube, fin or plate; and (c) heating such assembly to a temperature to form a eutectic alloy of said silicon and aluminum of the tube, plate or fin so that the eutectic migrates into the aluminum of said tube, plate or fin to form an autogenous joint.

10. The method as in claim 9, in which the forming step employs dies to bend and shape the tubes, plates or fins into the final assembly configuration.

11. The method as in claim 10, in which the thin sacrificial film of silicon additionally contains flow promoting material selected from the group of bismuth, strontium, and copper.

* * * * *